United States Patent
Lacour et al.

(10) Patent No.: US 7,740,203 B2
(45) Date of Patent: Jun. 22, 2010

(54) CONTROL DEVICE FOR DEPLOYMENT OF INFLATABLE STRUCTURES

(75) Inventors: Dominique Lacour, Tresses (FR); Brigitte Defoort, Saint Medard en Jalles (FR); Vincent Peypoudat, Morainvilliers (FR); Cyril Gautrias, Toulouse (FR)

(73) Assignee: Astrium SAS, Paris (FR)

( * ) Notice: Subject to any disclaimer, the term of this patent is extended or adjusted under 35 U.S.C. 154(b) by 482 days.

(21) Appl. No.: 11/718,109

(22) PCT Filed: Oct. 14, 2005

(86) PCT No.: PCT/FR2005/050856

§ 371 (c)(1),
(2), (4) Date: Apr. 27, 2007

(87) PCT Pub. No.: WO2006/048565

PCT Pub. Date: May 11, 2006

(65) Prior Publication Data

US 2009/0200427 A1    Aug. 13, 2009

(30) Foreign Application Priority Data

Oct. 29, 2004   (FR) .................................. 04 52487

(51) Int. Cl.
*B64G 1/00* (2006.01)
(52) U.S. Cl. ..................................... 244/158.3; 244/31
(58) Field of Classification Search ............... 244/158.3, 244/30, 31, 49, 123.11, 905, 100 A; 52/2.11
See application file for complete search history.

(56) References Cited

U.S. PATENT DOCUMENTS

| 2,587,564 | A | * | 2/1952 | Williams | ..................... 340/331 |
| 3,364,631 | A | * | 1/1968 | Pleasants | ..................... 52/2.22 |
| 4,711,416 | A | * | 12/1987 | Regipa | ......................... 244/31 |
| 4,795,112 | A | * | 1/1989 | Hashimoto | ................... 244/33 |
| 5,044,579 | A | * | 9/1991 | Bernasconi et al. | ...... 244/158.3 |

OTHER PUBLICATIONS

Cadogan, D. P. et al., "AIAA Paper 99-1075, Inflatable Solar Array Technology," AIAA Aerospace Sciences Meeting, May 1999, pp. 1-8.

(Continued)

*Primary Examiner*—Tien Dinh
(74) *Attorney, Agent, or Firm*—Perman & Green LLP (57) ABSTRACT

The invention relates to a device for controlling the deployment of an inflatable structure including, in the non-deployed state, a flexible tube (12) which is folded in zigzags and fixed to one end of a plug (13) provided with a buoyant gas admission (15), the other end of the tube being closed; means (25 to 29) for controlling the change of state of the tube from the folded state (12a) to the deployed state (30), the means being arranged inside the tube (12) and consisting of a set of interconnected flexible blades (25) which are radially arranged around the strut (16) in the form of petals, in such a way that the set can be displayed along the strut; and means (28, 29) for bringing the set of petals (25) towards the plug (13) in such a way as to press the folded part (12a) of the tube, each petal (25) being applied to a series of superimposed folds (21 to 24) of the folded part of the tube.

11 Claims, 6 Drawing Sheets

OTHER PUBLICATIONS

Tsunoda, H. et al., "AIAA Paper 2003-1979, Deployment Method of Space Inflatable Structures using Folding Crease Patterns," AIAA Structures, Structural Dynamics, and Materials Conference, Apr. 7-10, 2003, Norfolk, VA, USA, pp. 5285-5291.

* cited by examiner

Fig. 11 y-axis: Ratio: surface/cylinder surface (SO)
x-axis : H/R ratio : fold height/cylinder radius
-□- 4 sides: internal surface (square)/SO
-■- 4 sides: external surface (octagon)/SO
-○- 6 sides: internal surface (hexagon)/SO
-●- 6 sides: external surface (dodecagon)/SO

Fig. 12 y-axis: Ratio: length of folds/length of tube
x-axis : H/R ratio : height of fold/radius of the cylinder

- ▲ - 6 sides (Total)
- ····· 6 sides (Folds 50)
- -△- 6 sides (Folds 40 and 41)
- ■ - 4 sides: (Total)
- ——— 4 sides: (Folds 50)
- -□- 4 sides: (Folds 40 and 41)

CONTROL DEVICE FOR DEPLOYMENT OF INFLATABLE STRUCTURES

This application is the National Stage of International Application No. PCT/FR2005/050856, International Filing Date, 14 Oct. 2005, which designated the United States of America, and which international application was published under PCT Article 21(2) as WO Publication No. WO 2006/048565 A1 and which claims priority from French Application No. 0452487, filed 29 Oct. 2004.

The disclosed embodiments relate to a control device for deployment of structures in space, and more particularly to deployment by inflation. In a general way, when objects are sent into space, there is only a small space available under rocket nosecones or in space shuttle cargo bays. Thus these objects must be compacted, and they must be deployed as soon as they reach orbit. The best known example of such structures is that of solar arrays.

These deployments are usually carried out by means of mechanical systems that can be complex, taking into account the difficult conditions of the spatial environment, but systems of deployment by inflation have also been developed, which are potentially lighter in weight, less voluminous and less costly.

However, these systems are not yet operational due to technical difficulties that have not yet been fully resolved, among which the principal problems can be summarized as follows:

it is necessary to control deployment so that it is conducted according to the desired geometry;

it is necessary, after deployment, to make the structure rigid by a solution other than keeping it under pressure, since this cannot be done over the long term in space, taking into account the risk of leaks due to the environment;

it is necessary to assure that the deployment is conducted with sufficient regularity, compatible with the driven systems, and taking into account the situation of weightlessness.

The invention more particularly pertains to systems of deployment by inflation of a structure made of a flexible tubular envelope, stored before deployment by accordion folding, deployed in situ, then rigidified.

This known technology generally implements an inflatable tube axially folded on a mandrel consisting of a base, an axial tube and an upper part. The upper part of the mandrel has a deformable component that is supported on the inside of the inflatable tube so as to create a certain resistance to deployment. The inflation gas is introduced at the top of the mandrel so that only the deployed part of the tube is placed under pressure. The principle of such a system is described, for example, in the article "American Institute of Aeronautics and Astronautics" entitled "Inflatable solar array technology" AIAA-99-0-1075.

One variant described in the document "Deployment Control Mechanism for Inflatable Space Structures" from the 33$^{rd}$ "AEROSPACE MECHANISMS CONFERENCE" of May 1999 concerns a flexible accordion tube whose outer annular crests are extended toward the inside by walls forming a diaphragm.

The disclosed embodiments seeks to improve this type of deployment system, in particular, on the following points:

better control of deployment both in terms of regularity and the direction of deployment;

limitation of mass.

For this purpose, the subject of the invention is a control device for deployment of an inflatable structure of the type comprising, in the non-deployed state, a flexible accordion-folded tube joined at one end to a plug provided with an inflation gas inlet, the other end of the tube being sealed, means for controlling the passage of the tube from the folded state to the deployed state, these means being positioned inside the tube, characterized in that said means for controlling the passage from the folded state to the deployed state constitute, on the one hand, a set of flexible blades joined together and arranged like petals radially to a first strut coaxial to said folded tube, said set of blades being mounted to move along the strut, and, on the other hand, means for pulling said set of petals back in the direction of the plug so as to press the folded part of the tube in a constant manner so that each petal is applied in a roughly identical or completely identical manner onto a series of superposed folds of said folded part of the tube, which permits regular deployment of the inflatable tube by the force of regular release of the folds all along the deployment.

According to another characteristic of the device according to the invention, said guide means are made up of a circular guide positioned perpendicular to the axis of the folded tube and fixed to a strut. The strut is, according to a first variant, the strut coaxial to the folded tube attached to said plug, and according to a second variant, is a second strut outside the folded tube, the circular guide being shaped in a hoop.

According to a complementary characteristic, the inflation gas inlet is arranged so as to introduce said gas into said folded part of the tube.

Such a tube deployment device assures a deployment that is regular, secure, and without jerks, because the deployment of each fold of the tube is accompanied by a flexible petal which progressively moves aside and returns to the rear when the accompanied fold is released when it is finished unfolding, in order to be applied to the next fold in an identical manner, and this is continued until the tube is totally deployed.

We will now describe embodiments of the invention in more detail, referring to the attached drawings, in which.

Figure 1:
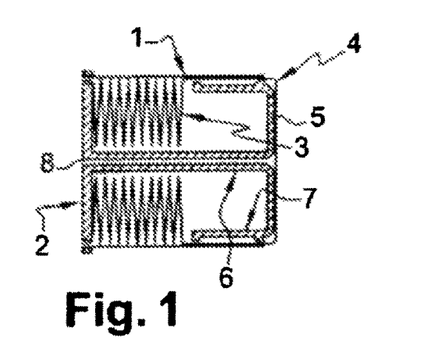
FIG. 1 is view of the a principle of a known system for deployment by inflation of a structure formed of a flexible tube stored in this folded state.
Figure 2:
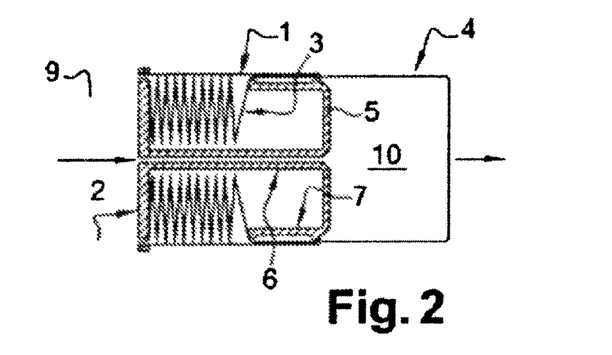
FIG. 2 shows the system of FIG. 1 at the beginning of deployment of the tube.

In FIGS. 1 and 2, a known system for deployment by inflation, which is designed for positioning space structures, is shown schematically.

This system comprises, in the folded state (FIG. 1), an outer rigid tubular envelope 1, joined at its base to a plug 2 and enclosing a flexible accordion-folded tube 3, for example, one end of which is joined to plug 2 and the other end 4 of which is sealed on itself by covering a circular guide 5 having an axis merged with that of envelope 1.

Guide 5 is joined to a central hollow strut 6, and has an internal cylindrical, skirt-shaped return piece 7, extending inside tube 3 and over which tube 3 passes when it is deployed (FIG. 2).

Plug 2 is provided with an opening 8 for introduction of the inflation air 9 which crosses hollow strut 6 in order to arrive at space 10 between guide 5 and the closed end 4 of tube 3, which is deployed over its entire length coaxially to rigid envelope 1.

These systems are not completely satisfactory with regard to reliability, regularity and precision of deployment, as was mentioned above, notably because the mechanical mounting is fixed and is not lowered as unfolding proceeds.

Figure 3A:
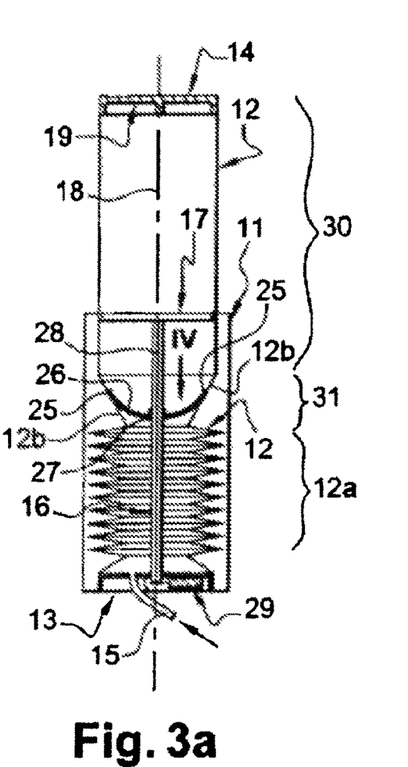
FIGS. 3A and 3B are axial sectional views of a device according to the invention.
Figure 3B:
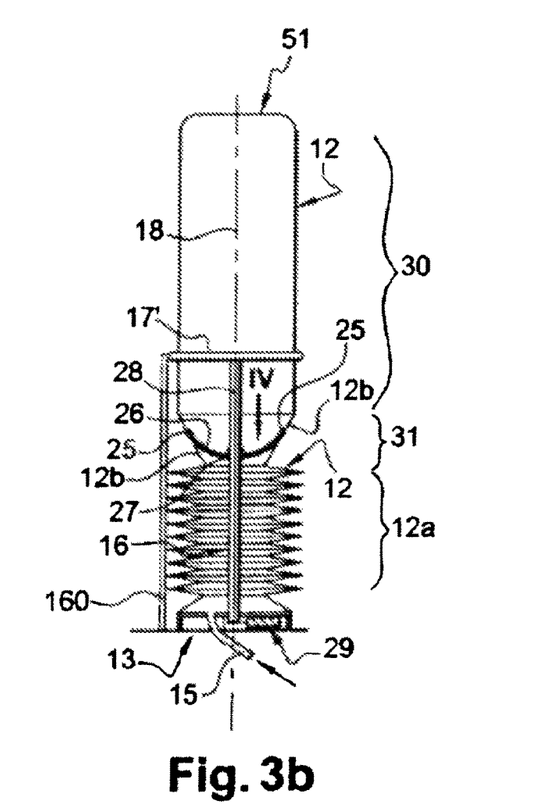

In order to remedy this, the device illustrated schematically in FIGS. 3A and 3B is proposed, which comprises a flexible accordion folded tube 12, fastened at a first end to a first plug 13, and at its other end, to a second plug 14 according to FIG. 3A. In FIG. 3A, plug 14 is shown at a distance from the accordion-folded part, tube 12 having begun its deployment, with the advanced part of the tube being unfolded.

In FIG. 3B, end 51 without the plug is also at a distance, since the tube has begun to be deployed.

Plug 13 is provided with an inflation gas inlet 15 directly inside folded tube 12, at its lower end.

In the device shown in FIG. 3A, the folded tube is enclosed in an outer tubular and rigid envelope diagrammed by reference 11, first plug 13 itself being attached to envelope 11. Such an envelope, as well as plug 14, are not essential to the invention, since the inflatable tube can remain in folded position without protection as in the case of the example of FIG. 3B, as long as a risk of degradation is not feared.

According to this same FIG. 3A, a hollow strut 16 is attached to plug 13 coaxial to the folded tube, at the end of which strut is positioned a circular guide 17, formed of a disk or ring perpendicular to axis 18 of assembly 11, 12, 13, 14, 16.

A guide 17 is found at the level of the upper end of envelope 11. Second plug 14, in the embodiment shown, is provided on its lower face with a recess 19 in which guide 17 will be restrained when the system is completely folded and sealed.

The variant of FIG. 3B shows a device according to the invention without the envelope and plug 14 and having an outer guide device 17' joined to an outer strut 160.

Figure 4:
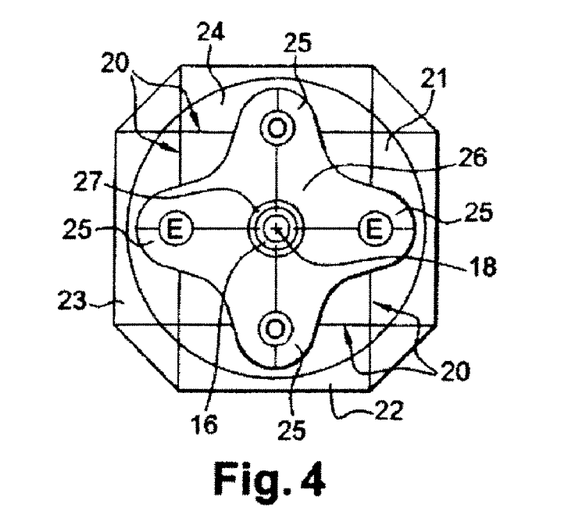
FIG. 4 is a top view according to arrow IV of the device of FIGS. 3A and 3B.

According to the two variants, tube 12 is folded in a so-called tetragonal manner, as illustrated in FIG. 4. This method of folding forms regular stacks of folds defining a central parallelepiped space with axis 18, with four sides represented by reference 20 in FIG. 4. The four vertical stacks of folds of folded part 12a of the tube (FIG. 3A) are designated by 21, 22, 23 and 24, respectively.

In the device of FIGS. 3A and 3B, a flexible blade 25 is positioned on top of each stack 21 to 24 of folded part 12a, the four blades 25 radiating like petals around strut 16, connected together by an annular binding zone 26 (FIG. 4), itself joined to a sleeve 27, mounted so as to slide along strut 16.

Sleeve 27 is connected to a cable 28 positioned inside strut 16 and connected to a device 29 fitted in plug 13, which is capable of exercising on cable 28 a recoil force determined so as to constantly press flexible petals 25 against the upper face of stacks 21 to 24.

Strut 16 is grooved axially so as to permit the connection between cable 28 and sleeve 27 and to permit sleeve 27 to slide along the strut during deployment of tube 12.

In the case of the variant of FIG. 3B, inner strut 16 is preserved so as to permit sleeve 27 to slide and flexible blade device 25 to function. A stop for the flexible blade device can replace guide 17 on strut 16.

Moreover, means (not shown) are provided to angularly wedge sleeve 27 on strut 16, i.e., to prevent its rotation, so that petals 25 remain facing stacks 21 to 24.

Petals 25 are preferably centered on stacks 21 to 24.

The device functions as follows:

At rest, according to the variant of FIG. 3A, tube 12 being completely folded, end 19 of the tube, possibly having plug 14 covers guide 17, and petals 25 are roughly horizontal on folds 12a, flattened against these folds by the recoil force of device 29.

According to the variant of FIG. 3B, distal end 51 of the tube rests directly on the flexible blade device which is then found on top of strut 16, close to the level of outer guide 17'.

The introduction of gas under pressure through conduit 15 to the inside of folded tube 1 induces the extension of end 19, 51 of the envelope, as illustrated by FIGS. 3A and 3B, and by constraining the tube to be deployed around fixed guide 17 or inside fixed guide 17', induces the successive deployment of the folds (21-24). Each layer of folds rises up like the folds shown by reference 12b in FIG. 3A, against the pressure exerted by the petals.

Considering the folding method of FIG. 4, first, the first pair of opposite folds 22 and 24 raise and bend facing a pair of petals 25, then the second pair of folds 21 and 23 are taken in charge by the other pair of opposite petals, and so on.

Thus, to the extent that the pull exerted by the inflation of part 30 of the tube increases, petals 25 are raised in an alternating manner as indicated above, against the recoil force of device 29, until said folds 12b are released from the petals. At this time, petals 25 fall back elastically under the conjugated action of their own elasticity and the recoil of device 29 to be flattened against the next layer of folds 21 to 24.

The cycle of raising the petals 25 and braking the ascension of the folds continues up to the last fold, in the area of plug 13.

A progressive, regular control, without jerks, is thus assured for the deployment of the successive folds of tube 12, with continuous readjustment of petal device 25 to 26, which will progressively descend along strut 27 in order to be constantly even with the layer of top folds of the rest of the folded tube, referenced by 12a in FIGS. 3A and 3B, zone 31 being the unfolding zone for the folds.

Figure 5:
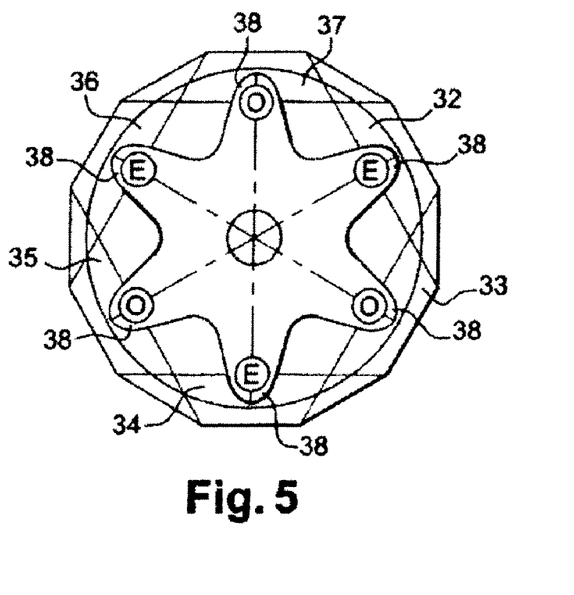
FIG. 5 is a view analogous to that of FIG. 4 but for a method for accordion folding of the hexagonal-type tube.

According to a view analogous to that of FIG. 4, FIG. 5 shows another folding method, also known in itself, called hexagonal, which can also be applied to the folding of tube 12.

This folding method defines six stacks of folds, 32 to 37 respectively, thus also imposing petals 38 of forms similar to those of FIG. 4, but narrower or more tapered, the rest of the deployment device being identical to that of FIGS. 3 and 4. In this method of folding, the folds are deployed three by three, i.e., folds 32, 34, 36, and then folds 33, 35 and 37, and so on.

Figure 6:
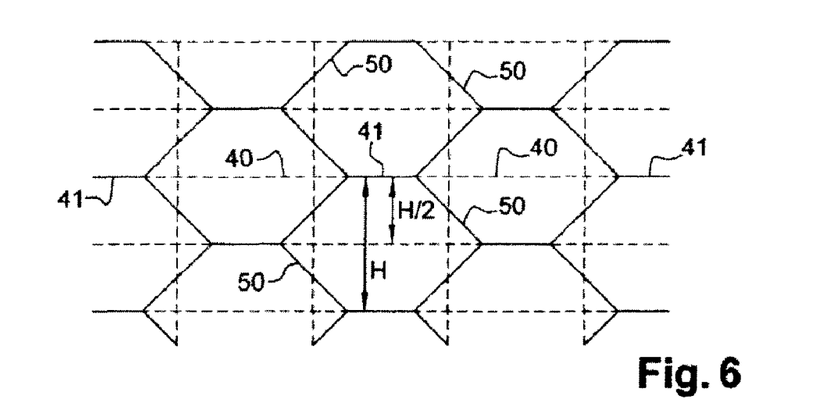
FIG. 6 illustrates the principle of tetragonal folding.

FIG. 6 illustrates the tetragonal folding principle, which is the preferred method for the device according to the invention, as will be explained below.

Figure 7:
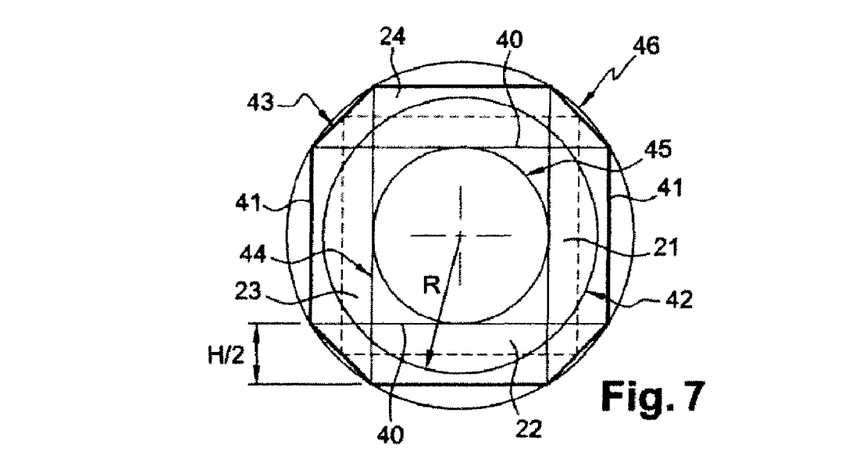
FIG. 7 shows a tetragonally folded tube in top view.

In FIG. 6, an edge of the hollow fold that will be found on the tetragonal fold viewed from the top of FIG. 7 is represented by reference 40. An edge of the top of the fold is represented by reference 41. Two edges 40 and two edges 41 make a complete turn of the tube. A zigzag folding line is referenced by 50.

The circle of the deployed tube is represented by reference 42 in FIG. 7, with its radius R, and H/2 is half the height of the fold, also shown n FIG. 6. Reference 43 is the outer edge (octagonal) of the fold, reference 44 is the inner edge (square), and reference 45 is the inner circle tangential to the four stacks of folds 21 to 24 and reference 46 is the outer circle circumscribing the folding assembly.

Figure 8:
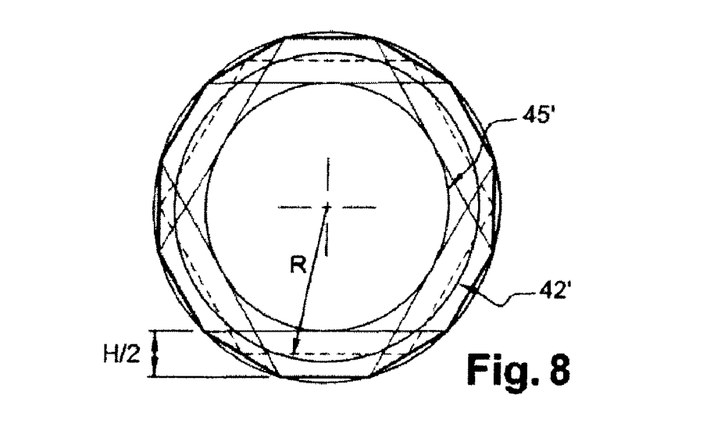
FIG. 8 shows the same tube folded hexagonally.

FIG. 8 is a view analogous to that of FIG. 7, with hexagonal-type folding, with its inner circle 45' and deployed tube circle 42'.

Figure 9:
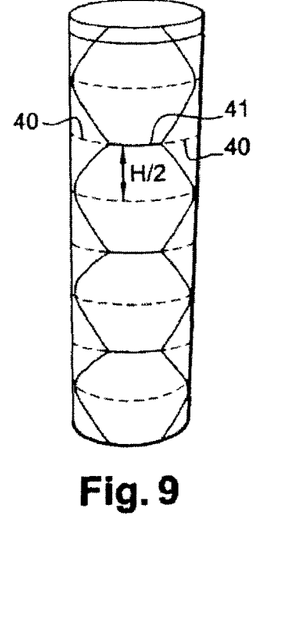
FIG. 9 shows a deployed tube, previously tetragonally folded.

FIG. 9 shows a deployed tube in which is included the folding diagram of the tetragonal type according to FIG. 6.

Figure 10A:
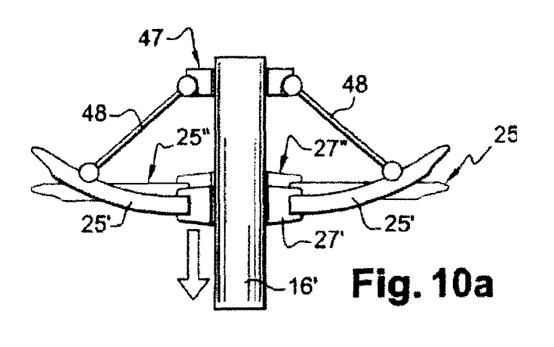
FIGS. 10a and 10b show a variant of embodiment of the means for pulling back the petals for controlling the deployment of the tube, in two states of functioning.
Figure 10B:
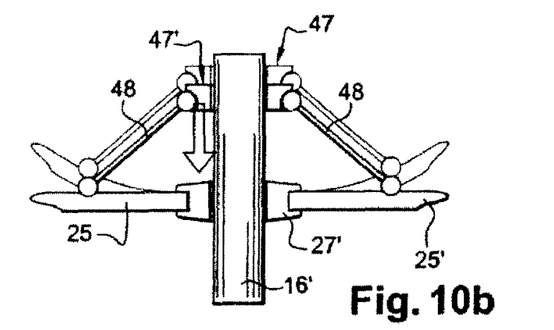

FIGS. 10a and 10b show one variant of embodiment of the petal recoil means of the deployment device of FIGS. 3A and 3B.

A strut 16' is shown in FIGS. 10a, 10b, analogous to strut 16 at reference 25' for the petals and a sleeve 27' for moving the petals analogous to petals 25 and sleeve 27 of FIG. 1.

Petals 25' are joined near their end to a collar 47 by means of connecting rods 48. Collar 47 is mounted so as to slide on strut 16', on top of sleeve 27', but a catch (not shown) allows only the descent of the collar along the strut.

Likewise, sleeve 27' is mounted so as to slide on strut 16', but a catch (not shown) allows only the descent along the strut.

Moreover, means (not shown) are provided to impede any rotation of elements 27' and 47 around strut 16' so that petals 25' remain constantly facing stacks of folds 21 to 24 (see FIG. 4).

The device made up of cable 28 and recoil 29 of FIG. 3A is, of course, not present in this embodiment.

The device functions as follows:

In the rest position, the petals are horizontal (position 25", FIG. 10a) and the sleeve is at position 27".

As soon as the tube begins to be deployed, the first folds (21 to 24) begin to raise the petals (position 25', FIG. 10a).

By the butting action of connecting rods 48 on collar 47, which cannot rise along strut 16', the petals are bent and press the sleeve toward the bottom (position 27', FIG. 10a) which moves a few millimeters. When the petals are released by the deployed folds, they return to their horizontal position (position 25', FIG. 10b), and are flattened against the second layer of folds by the recoil device. After this, they lower collar 47 by connecting rods 48, and the collar takes position 47' (FIG. 10b) corresponding to a positioning horizontal to petals 25' of FIG. 10b.

This automatic movement cycle of the petals-connecting rods 48-collar 47 assembly is then repeated for each layer of folds, so that said assembly remains constantly in contact with the top of the stacks of folds, in proportion to the shortening of folded part 31 (FIGS. 3A and 3B) during deployment of the tube.

This device is adapted to any length of folded tube, and is compatible with a broad range of tube diameters.

The recoil force exerted on the petals depends on the flexibility of the petals. For example, petals (25, 25', 38) are made of a composite material from preimpregnated "Hexcel-Hexply 66HM10" folds, for a tube (12) of 160 mm deployed under a relative pressure of 0.25 bar, the tube being made up of 3 layers, one of "Kapton" of 50 µm, one of preimpregnated glass/resin of 300 µm, and the third of "Kapton" of 50 µm.

The weight of this device is the same regardless of the length of the folded tube. Finally, this device is totally contained in the inner volume of the folded tube and occupies a minimum space, reduced to solely the diameter of strut 16' in the central folding space of zone 31.

Figure 11:
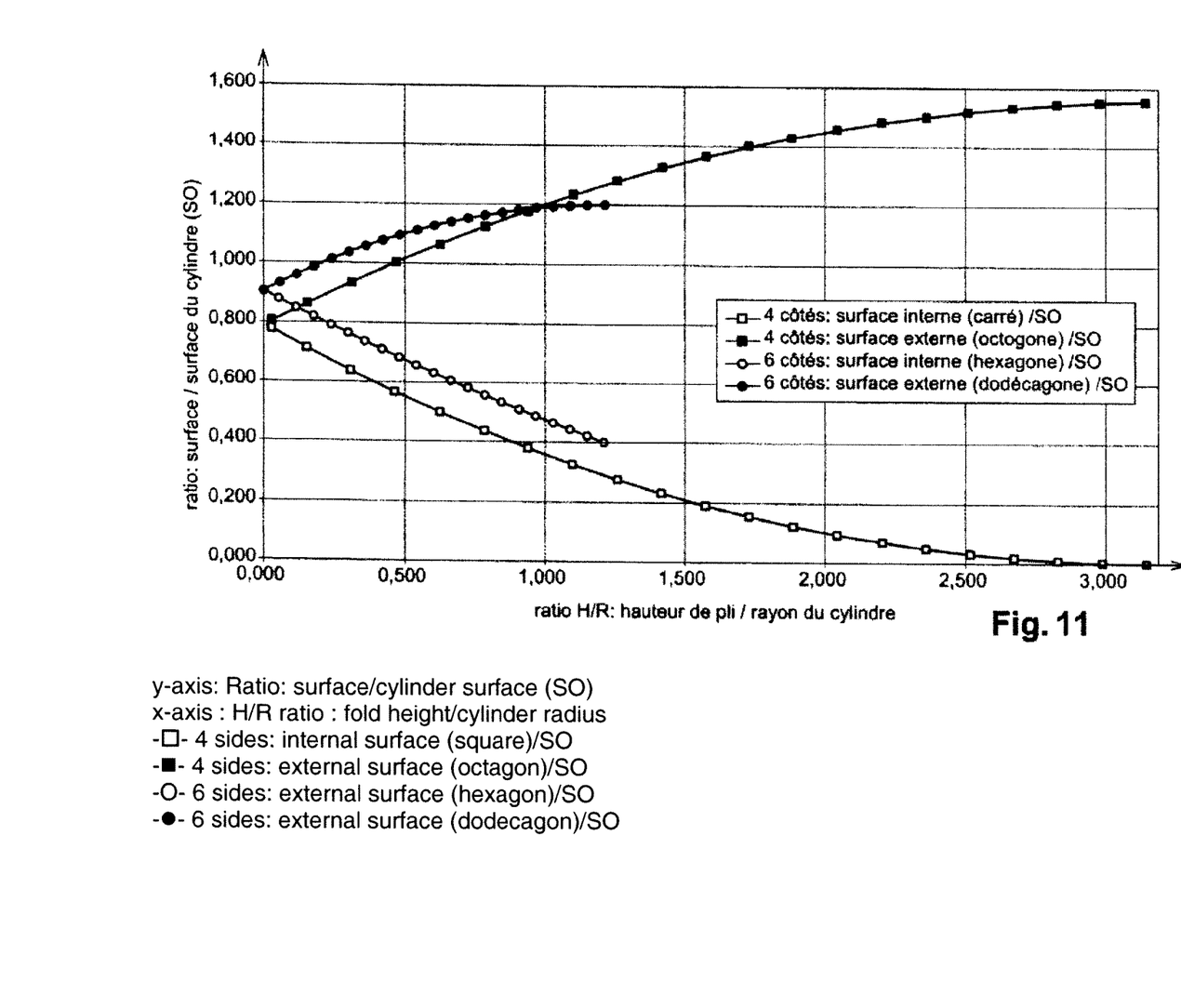
FIGS. 11 and 12 are curves illustrating the particular points of the folding methods, with four and six sides, respectively.

FIG. 11 shows curves illustrating the particular points of these two folding methods, tetragonal and hexagonal. The H/R ratio is given on the x-axis and the (inner/outer) surface/cylinder surface ratio (tube 12) is given on the y-axis.

The curves show:
that the length of folds is less for the tetragonal method with regard to folds 40+41, independent of H/R ratio.
that the length of folds 50 is identical in the tetragonal and hexagonal methods, but the greater the H/R is, the shorter is this fold 50.

Figure 12:
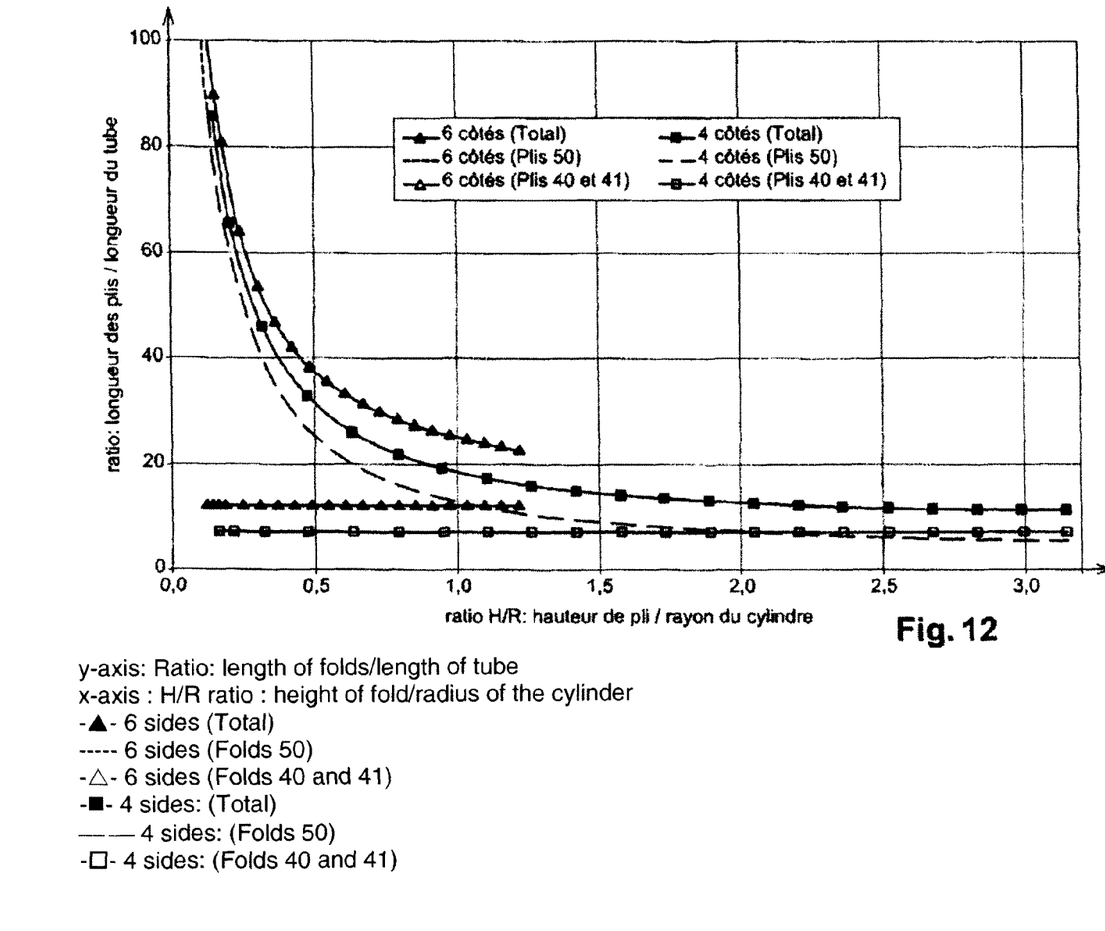

FIG. 12 also shows curves illustrating other particular points of said tetragonal and hexagonal folding methods. The x-axis gives the H/R ratio and the y-axis gives the ratio of the length of the folds (40, 41, 50)/length of tube 12.

The figure shows the ratios between the outer surface and the surface of the unfolded tube at the upper part, and the empty surface at the center relative to this unfolded surface at the bottom. It is noted that, with regard to the hexagonal method, there is a maximum H/R ratio, towards 1, 2, that is less effective, while in the tetragonal method, the higher the H/R ratio is, the smaller the central void (45, 45') is. There results, again, the choice of tetragonal folding and the choice of the optimum value at 1.6 of the H/R ratio for the fold height (H) over radius R of the deployed tube, which is for this tetragonal folding method, in the range of 1.5-2.1. This latter choice is linked to the fact that if the central void is too small, the various folds are in contact with each other, and rub together, which complicates deployment and may adversely affect the tube.

Figure 13:
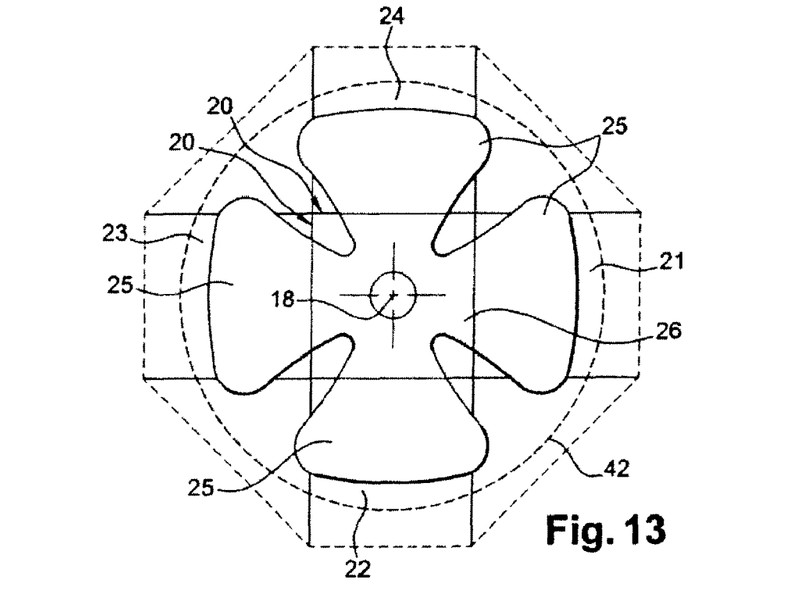
FIG. 13 shows a preferred embodiment of the deployment control petals of the tube.

FIG. 13 is a view analogous to that of FIG. 4 illustrating one preferred embodiment of four petals in the tetragonal folding method.

Petals 25 are preferentially formed into a cloverleaf, i.e., becoming wider in proportion to their extension relative to axis 18 so as to maximize the contact surface between the petals and stacks 21 to 24, inside circle 42 of the deployed tube.

Finally, it is noted that the device of FIGS. 3A and 3B is simply an explanatory example and that the device of the invention need not include the guide.

The invention claimed is:

1. A device for controlling the deployment of an inflatable structure comprising, in the non-deployed state, an accordion-folded flexible tube connected at one end of a plug provided with an inlet for inflation gas, an other end of the flexible tube being sealed, means for controlling passage of a folded part of the flexible tube to a deployed state, positioned inside the flexible tube, wherein the means for controlling the passage of the flexible tube from the folded state to the deployed state comprises a set of flexible blades joined together and positioned radially to a first strut, coaxial with said folded part of the flexible tube, said set of flexible blades being mounted to move along the first strut, and, means for recoiling said set of flexible blades in the direction of plug so as to press the folded part of the flexible tube, each blade being applied onto a series of superposed folds of said folded part of the tube.

2. The device according to claim 1, further comprising guide means made up of a circular guide positioned perpendicularly to an axis of the folded part of the flexible tube.

3. The device according to claim 2, wherein the circular guide is attached to the first strut and attached to said plug.

4. The device according to claim 2, wherein the circular guide is attached to a second strut outside the folded part of the flexible tube.

5. The device according to claim 1, wherein said recoil means for said set of flexible blades comprises a sleeve configured to slide on an outside of the first strut, and onto which said blades are attached, a recoil device joined to said plug and a cable connecting the recoil device to said sleeve, said first strut being configured to permit said sleeve to slide while being blocked from rotating around the first strut.

6. The device according to claim 1, wherein said means for recoil of said set of flexible blades comprise a sleeve configured to slide on an outside of said first strut and on which said set of flexible blades are attached, a collar sliding along said first strut positioned on top of said sleeve, connecting said set of flexible blades to said collar, and means configured so that said sleeve, connecting rods and collar can only slide in the direction of the folded part of the flexible tube and preventing rotation of the connecting rods and collar around the first strut.

7. The device according to claim 1, wherein the tube is configured to be folded according to a tetragonal folding method, said set of flexible blades comprises a set of four blades and facing four stacks of folds of the folded part of the flexible tube and connected to a common annular part.

8. The device according to claim 7, further wherein is a ratio of folding height (H) over radius (R) of the deployed tube in the tetragonal folding method is in the range of 1.5 to 2.1.

9. The device according to claim 8, wherein said height to radius ratio is 1.6.

10. The device according to claim 1, wherein the blades are configured in a cloverleaf shape, the cloverleaf shape becoming broader further from a centerline of the tube.

11. The device according to claim 1, wherein the inlet for inflation gas is configured to introduce said inflation gas inside said folded part of the flexible tube.

\* \* \* \* \*